(12) United States Patent
Kajihara

(10) Patent No.: US 6,393,006 B1
(45) Date of Patent: May 21, 2002

(54) CHANNEL SCANNING METHOD FOR PORTABLE TERMINAL DEVICES

(75) Inventor: Yasunari Kajihara, Tokyo (JP)

(73) Assignee: Oki Electric Company Industry Co., Ltd., Tokyo (JP)

( * ) Notice: Subject to any disclaimer, the term of this patent is extended or adjusted under 35 U.S.C. 154(b) by 0 days.

(21) Appl. No.: 09/196,143

(22) Filed: Nov. 20, 1998

(30) Foreign Application Priority Data

Feb. 18, 1998 (JP) ............................................. 10-052794

(51) Int. Cl.[7] ................................................ H04J 13/00
(52) U.S. Cl. ...................................... 370/335; 455/553
(58) Field of Search ................................. 370/335, 337, 370/342, 441, 208, 209, 203; 455/434, 515, 426, 552, 553, 161.1; 375/130

(56) References Cited

U.S. PATENT DOCUMENTS

| 5,044,010 | A | * | 8/1991 | Frenkiel et al. ............. 455/464 |
| 5,809,419 | A | * | 9/1998 | Schellinger et al. ......... 455/434 |
| 5,896,572 | A | * | 4/1999 | Scotton ....................... 455/452 |
| 6,009,325 | A | * | 12/1999 | Retzer et al. ................ 455/434 |
| 6,026,300 | A | * | 2/2000 | Hicks .......................... 455/434 |
| 6,052,590 | A | * | 4/2000 | Hicks et al. ................. 455/434 |
| 6,192,239 | B1 | * | 2/2001 | Lee et al. .................... 455/425 |
| 6,205,334 | B1 | * | 3/2001 | Dent ........................... 455/434 |
| 6,263,010 | B1 | * | 7/2001 | Naruse et al. ............... 375/130 |

* cited by examiner

Primary Examiner—Douglas Olms
Assistant Examiner—Ken Vanderpuye
(74) Attorney, Agent, or Firm—Rabin & Berdo, P.C.

(57) ABSTRACT

After the switch of a CDMA/AMPS dual-mode portable terminal device is turned ON, the device operates to search for operation history so as to investigate a previously caught channel at step P-3. When a previously caught channel is a CDMA channel, a channel scanning is started from a CDMA system. When a previously caught channel is an AMPS channel, a channel scanning is started from an AMPS system. Usually, when a portable terminal device is restarted, the device is restarted in the same area as in a previous time. Therefore, the device operates to store a previously caught channel and a previously used PN value, while a channel scanning is started from the PN value of said channel. In this way, it is allowed to reduce a time necessary for the above search until a proper channel is caught.

8 Claims, 3 Drawing Sheets

CHANNEL SCANNING METHOD FOR PORTABLE TERMINAL DEVICES

BACKGROUND OF THE INVENTION

1. Field of the Invention

The present invention relates to a channel scanning method for operating a dual-mode portable terminal device.

2. Description of the Related Art

With various portable telephones used to communicate over radio waves, demand has led to increasing subscribers admitted on the communication system, despite limited frequency bands. In order to meet this need, a conventional analog system called AMPS (Advanced Mobile Phone System) has been in a process of being changed over to an easily operable multiple digital System called CDMA (Code Division Multiple Access).

However, in a period of transition from the analog AMPS to the digital system CDMA, there are still many areas designed to receive both analog and digital services. In such areas it is possible to establish communication with the use of either AMPS or CDMA. Further, a CDMA/AMPS dual-mode portable terminal device has been developed to receive both services.

A conventional CDMA/AMPS dual-mode portable terminal device is designed to operate in the following manner.

FIG. 3 is a schematical block diagram indicating a flow chart of an operation of a conventional CDMA/AMPS dual-mode portable terminal device.

Here, the operation of the conventional CDMA/AMPS dual-mode portable terminal device will be described in accordance with steps S-1 through S-10 in FIG. 3.

Step S-1 (Power ON)

At step S-1, a subscriber (user) in a certain area switches ON his or her CDMA/AMPS dual-mode portable terminal device.

Step S-2 (Initial Setting)

At step S-2, the CDMA/AMPS dual-mode portable terminal device receives a plurality of signals transmitted from a plurality of nearby base stations, and determines which one of the several systems prescribed by International Standard IS-95A, a CDMA spread spectrum standard, is suitable for use with a received signal. Under the International Standard IS-95A, a frequency band used in portable telephone communication is divided into several channels, with each channel being assigned with one of the above systems. After one suitable system is determined and one suitable (i.e., available) channel is caught, the program goes to an Idle state. In this way, a series of operations including the switch-ON of the terminal device, the catching of a suitable or proper channel, the proceeding to the Idle state, is called a channel scan or channel scanning.

Step S-3 (Search in Each PN)

A portable terminal device contains within itself a correlator and a PN code generator. Here, PN code means a series of pseudo-random noise codes which have been set in advance for each channel, or set for each terminal, for diffusibly modulating digital signals. A conventional well-known sliding correlator and a retardation line matching filter may be used. The PN code generator may provide a great number of PN codes (prepared in advance) to the correlator, beginning with a PN code of number 1, number 2, . . . Then, with the use of an output signal from the correlator, the device may determine which PN code is coincident with a PN code contained in a signal transmitted from a nearby base station. If a PN code contained in a signal transmitted from a nearby base station is coincident with a PN code prepared as number K PN code, a PN value of K may be assigned.

The use of a digital CDMA system enables an increase in the number of signals corresponding to the sorts of the PN codes, using only a single channel involving only a single frequency.

Step S-4 (Determination)

If a PN code contained in a received signal is coincident with a PN code fed into the correlator from the PN code generator, the correlator will produce a signal having a level higher than a predetermined threshold level. At this moment, a search result is used as a hit result, and the program goes to step S-5. On the other hand, if the correlator does not produce a signal having a level higher than a predetermined threshold level, the program goes to step S-8.

Step S-5 (Catching a CDMA Channel)

At step S-5, the CDMA/AMPS dual-mode portable terminal device obtains a PN value at a time when the correlator has produced a signal having a level higher than a threshold value, and program goes to step S-6.

Step S-6 (CDMA in Idle State)

Using the above PN value, a desired telephone communication may be conducted through a channel with the use of a digital CDMA system. Namely, with the use of the above PN value, the digital system may catch a channel enabling a desired telephone communication, and the program goes to an Idle state waiting for another call.

Step S-7 (Power OFF)

While in the Idle state waiting for another call is to be released, the user switches OFF the CDMA/AMPS dual-mode portable terminal device.

In the following, an explanation will be given to a condition where the correlator does not produce a signal having a level higher than a predetermined threshold level so that a search fails in catching a suitable channel. At this moment, the program goes to step S-8.

Step S-8 (Catching an AMPS Channel)

At step S-8, the frequency of a signal being received is detected. If the detected frequency equals the frequency using analog AMPS, the channel is thus caught and the program goes to step S-9. Since a signal at this moment corresponds to an analog signal, it is possible to catch a channel of AMPS by tuning a receiver.

Step S-9 (AMPS in Idle State)

By adjusting the above frequency to a receiving frequency, a desired telephone communication through a channel using analog AMPS may be enabled. Namely, catching an analog channel of AMPS permits a desired telephone communication, after which the program goes to an Idle state waiting for another call.

Step S-10 (Power Off)

While in the Idle state waiting for another call is to be released, the user switches OFF the CDMA/AMPS dual-mode portable terminal device.

However, there are some problems with the above process when using the conventional CDMA/AMPS dual-mode portable terminal device.

For example, as shown in FIG. 3, at step S-3, during a search for obtaining a PN value, the PN code generator applies to the correlator a great number of PN codes (prepared in advance), beginning with a PN code of number 1. In this way, a PN search will be performed where a service using the digital system CDMA cannot be received. In order to determine which of the many systems prescribed by the International Standards IS-95A is suitable for treating a received signal, such kind of search is often performed, and approximately 30 seconds are needed to exact a search for a channel of digital system CDMA. As a result, a relatively long time interval occurs between the switching-ON of the terminal device and the arrival at the Idle state for waiting for a call.

Moreover, in areas where a service of digital system CDMA can not be received, the process must transfer to a search for a channel of analog AMPS. This, however, would need a further time interval of 5 seconds. In this way, if the above two kinds of time intervals are added together, a total time interval of approximately 35 seconds would be needed from the switching-ON of the terminal device to the arrival at the Idle state for waiting for a call. During the above time interval, a user of a portable telephone cannot perform either signal transmission or signal receiving, reducing the efficiency of telephone communication.

The International Standard IS-95A is incorporated by reference.

SUMMARY OF THE INVENTION

In view of the above discussed problem associated with the above mentioned prior art, it is an object of the present invention to provide an improved channel scanning method for operating a portable terminal device, which method permits a portable terminal device to catch a suitable channel within a short time, reducing wait time, thereby enabling the user to use the portable terminal device with high efficiency.

According to an aspect of the present invention, there is provided a channel scanning method used for a dual-mode portable terminal device capable of handling both an AMPS and a CDMA system, the method comprising:

storing information for identifying a channel caught in a previous Idle state;

storing a PN value used in said previous Idle state, when said channel caught in said previous Idle state corresponds to a CDMA channel;

starting a CDMA channel scan from the CDMA system when the channel caught in a previous Idle state is a CDMA channel;

starting an AMPS channel scan from an AMPS when said channel caught in said previous Idle state is an AMPS channel; and searching a previously used PN value or a nearby PN value so as to catch a suitable channel.

According to a further aspect of the present invention, the channel scanning method of a portable terminal device, further comprising:

starting said AMPS channel scan when said CDMA channel scan is started from the CDMA system and said previously used PN value or said nearby PN value is searched but the device fails to catch a suitable channel.

According to a still further aspect of the present invention, the channel scanning method of a portable terminal device, further comprising:

starting said CDMA channel scan upon catching said AMPS channel.

According to a still more aspect of the present invention, there is provided a channel scanning method of a portable terminal device responsive to a CDMA system, the method comprising:

storing a PN value used in a previous Idle state; and starting a channel scan from searching a previously used PN value or a nearby PN value so as to catch a proper channel.

DESCRIPTION OF THE PREFERRED EMBODIMENTS

An embodiment of the present invention will be described with reference to the companying drawings.

Figure 1:
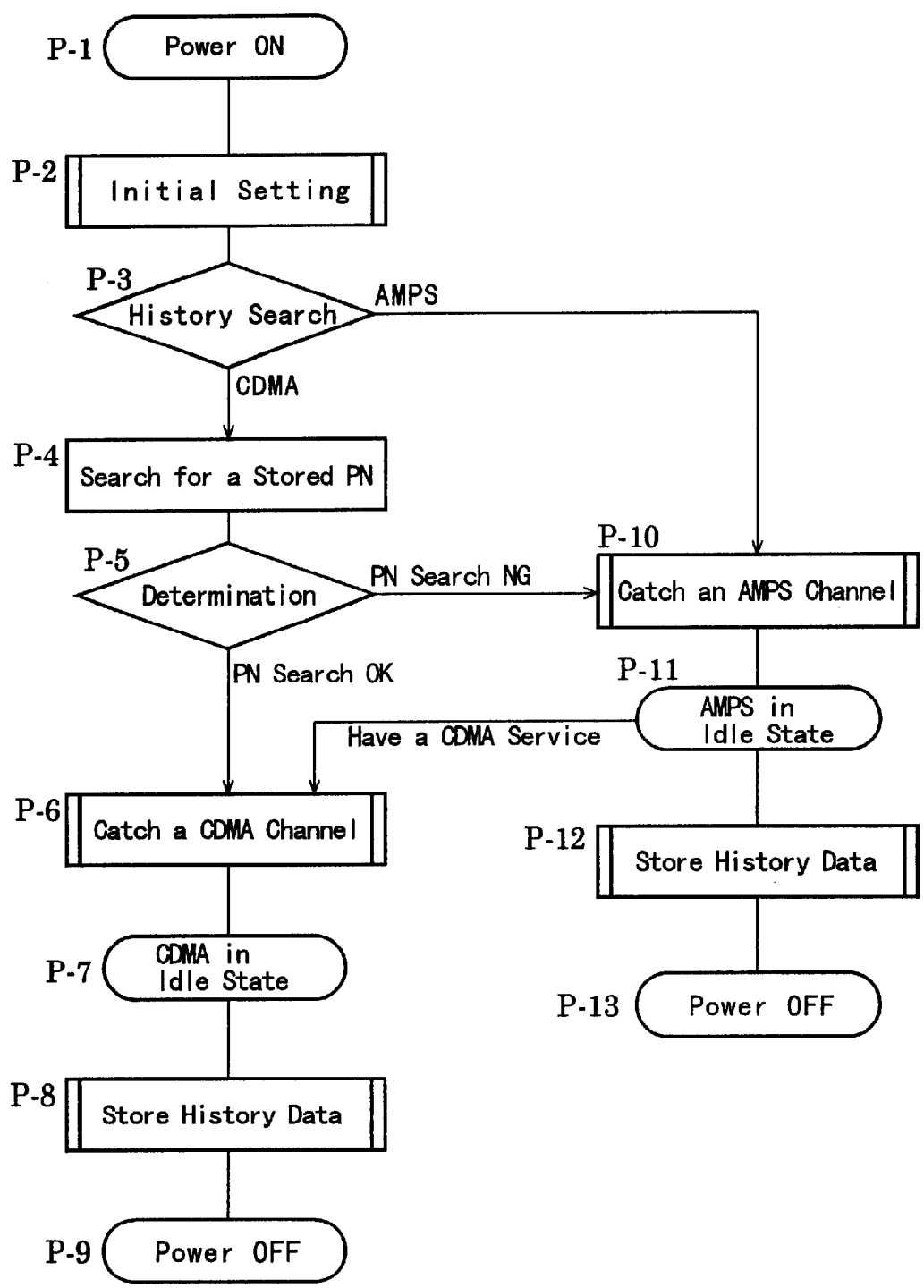
FIG. 1 is a block diagram indicating a flow chart for a channel scanning method in accordance with the present invention, particularly showing how a CDMA/AMPS dual-mode portable terminal device operates from its switching-ON, through the catching of a proper channel, until arrival at an Idle state.

FIG. 1 is a block diagram indicating a flow chart for a channel scanning method in accordance with the present invention, particularly showing how a CDMA/AMPS dual-mode portable terminal device operates from its switching-ON, through the catching of a proper channel, until arrival at an Idle state.

An operation of a CDMA/AMPS dual-mode portable terminal device using the method of the present invention will be explained in detail in accordance with steps P-1 through P-13 of FIG. 1.

Step P-1 (Power ON)

At step P-1, a subscriber (user) in a certain area switches ON his or her CDMA/AMPS dual-mode portable terminal device without knowing whether digital CDMA and/or analog AMPS may be received. The CDMA/AMPS dual-mode portable terminal device operates to perform a channel scan, identify the type of a service being provided, and catch one of the several channels available.

Step P-2 (Initial Setting)

At step P-2, the CDMA/AMPS dual-mode portable terminal device receives a plurality of signals transmitted from a plurality of nearby base stations, and then determines which one of the several systems prescribed by International Standard IS-95A is suitable for use with a received signal.

Step P-3 (History Search)

According to the method of the present invention, an identifying information for identifying a caught channel (when in an Idle state) between the switching-ON and the switching-OFF of a previous operation, is maintained as an operation history, which is used for channel scanning during a next operation.

At step P-3, state information stored in the above memory is read out so as to investigate whether a channel caught in a previous operation is a channel of digital system CDMA or a channel of an analog AMPS. If a caught channel is a CDMA channel, the program goes to step P-4. On the other hand, if a caught channel is an AMPS channel, the program goes to step P-10.

Now, the explanation will be given to a condition where a previously caught channel is a CDMA channel.

Step P-4 (Search for a Stored PN)

If a previously caught channel is a CDMA channel, the area may be assumed to receive a CDMA service and that a switch has been turned ON, and it is necessary to try to catch the CDMA channel. However, the above operation history contains not only information for identifying a caught channel, but also a previously used PN value. In such a case, provided that the user does not move to an alternate area, said PN value or a nearby PN value may be used, enabling the device to search for a PN value only from a plurality of nearby PN values.

Figure 3:
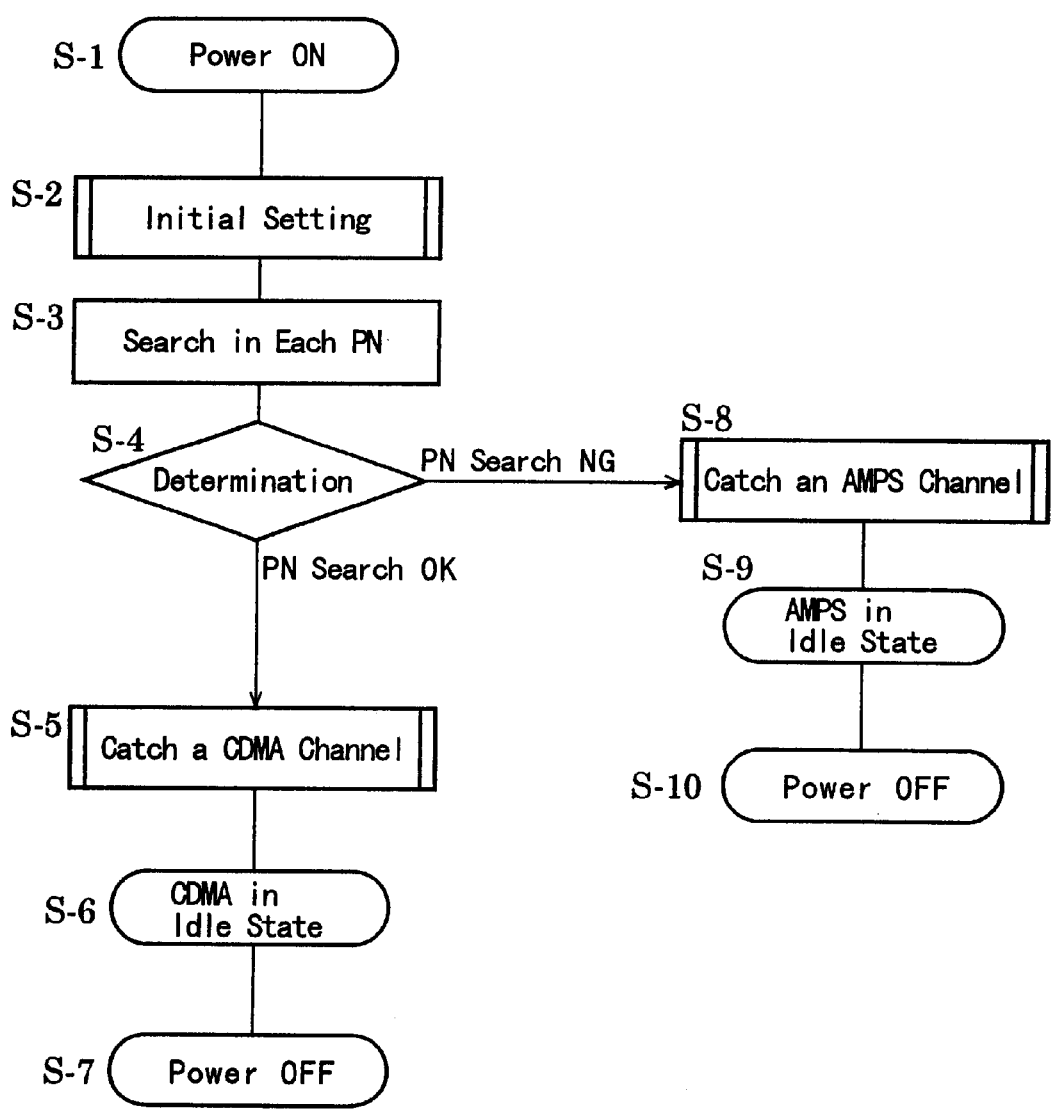
FIG. 3 is a block diagram indicating a flow chart showing a conventional method for operating a CDMA/AMPS dual-mode portable terminal device.

By contrast, in the prior art shown in FIG. 3, at step S-3 the PN code generator operates to successively supply to the correlator a great number of PN codes (prepared in advance), beginning with a PN code of number 1. The channel scanning starts with a channel which has a high probability of being caught, such as for a nearby PN value. In this manner, the necessary time from the start of the operation to the catching of a suitable or proper channel may be reduced.

Step P-5 (Determination)

During a time period when searching for a PN code in accordance with the above principles, if a PN code of a received signal is coincident with a PN code fed to the correlator from the PN code generator, the correlator will produce a signal having a level higher than a predetermined threshold value. At this moment, a search result is assumed to be a hit one, and the program goes to step P-6. On the other hand, if the correlator does not produce a signal having a level higher than a predetermined threshold value, the program will goes to step P-10.

Step P-6 (Catching a CDMA Channel)

The CDMA/AMPS dual-mode portable terminal device obtains a PN value at a time when the correlator has produced a signal having a level higher than a threshold value, and the program goes to step P-7.

Step P-7 (CDMA in Idle State)

By using the above PN value, the desired telephone communication may be performed through a CDMA channel. Namely, with the use of the above PN value, a CDMA channel may be caught which permits a desired telephone communication, and thus the program goes to an Idle state waiting for another call. The operations in steps P-6 and P-7 are the same as those in steps S-5 and S-6 in prior art FIG. 3.

Step P-8 (Storing History Data)

When the Idle state is to be released, the user can switch OFF the CDMA/AMPS dual-mode portable terminal device. In the present invention, prior to the switching OFF, a caught channel and its PN value are written as history into the device memory. Nevertheless, if a PN value is distinguishable from information for identifying a channel, only the PN value need be stored for channel identification for indicating that the CDMA channel has been caught.

Step P-9 (Power OFF)

Finally, the user switches OFF the CDMA/AMPS dual-mode portable terminal device.

On the other hand, at step S-3 if the previously caught channel is an AMPS channel, the program goes to step P-10.

Step P-10 (Catching AMPS Channel)

At step P-10, the frequency of a signal being received is detected. If a detected frequency comes within a frequency of an AMPS channel, the AMPS channel is thus caught, and the program goes to step P-11.

Step P-11 (AMPS in Idle State)

By setting the above frequency to a data receiving frequency, a desired telephone communication may be conducted with the use of a corresponding AMPS channel. Namely, an AMPS channel is caught, enabling a desired telephone communication, and the program goes to an Idle state waiting for another call. In practice, the procedure from the catching of the above channel to the arriving at the Idle state, is the same as the prior art.

Step P-12 (Storing History Data)

When the Idle state is to be released, the user can switch OFF the CDMA/AMPS dual-mode portable terminal device.

In the present invention, prior to the switching OFF, a channel caught and its frequency are written as history into the memory. Nevertheless, if the frequency of the channel is distinguishable from other information such as an identifying information (for identifying a channel) and a PN value, the frequency data stored provides channel identification for indicating that the AMPS channel has been caught.

Step P-13 (Power OFF)

Finally, the user switches OFF the CDMA/AMPS dual-mode portable terminal device.

If, in step P-5 (Determination), the correlator does not produce a signal having a level higher than a predetermined threshold value, and hence the search result fails to catch a suitable channel, the program will goes to step P-10.

At this moment, two possible cases (a) and (b) may be assumed.

(a) Since a required radio wave can not reach this area, CDMA service is not possible.

(b) Although it is impossible to receive a CDMA service with the use of a PN value stored as history and a nearby PN value, it is still possible to receive the CDMA service with the use of other PN value.

In the above case (b), there are two possibilities: first to simultaneously receive both CDMA service and AMPS service, and second to receive only the CDMA service.

Step P-10 (Catching an AMPS Channel)

In the above case (a), an operation may be performed in an order of the above step P-1, step P-12, step P-13 to receive an AMPS service. Even in this case, search for a PN value after switching ON, may be carried out with the procedure of step P-4, ensuring that the search may be accomplished within a shorter time than the above-discussed prior art, thereby allowing the channel scan to be completed in a short time.

In the above case (b), the program first goes to step P-11 attempting to catch an AMPS channel. If the AMPS channel is caught, the program goes to an Idle state. This procedure is the same as that in the above step P-10 and step P-11. Under such a state, it is possible to receive AMPS service.

However, once the user starts to receive the AMPS service, area broadcast information from a base station will be received. This area information contains information indicating that CDMA service is being provided in that area. In a case where a dual-mode portable terminal device is used, catching a CDMA channel may be preferred to avail of a high quality signal. For this reason, upon identifying the information indicating availability of CDMA service, the program returns to step P-6. At step P-6, a PN value may be searched with the use of a conventional method, so that a CDMA channel is caught. Afterwards, the program may proceed of to step P-7, step P-8, and step P-9.

Although it has been described in the above explanation that the method of the present invention is useful with a dual-mode portable terminal device, the present invention is not limited to such a specific embodiment.

For example, the method of the present invention may be used to operate a portable terminal device (capable of receiving a CDMA service) to catch a proper channel within a short time. In such a case, as operation history it necessary to store only a previously used PN value. The channel scanning may be started from this PN value or nearby PN value. In case a search for a PN value is not successful, the search for a PN value may be performed in a conventional method.

Hardware for storing state information will be briefly described in the following paragraphs.

Figure 2:
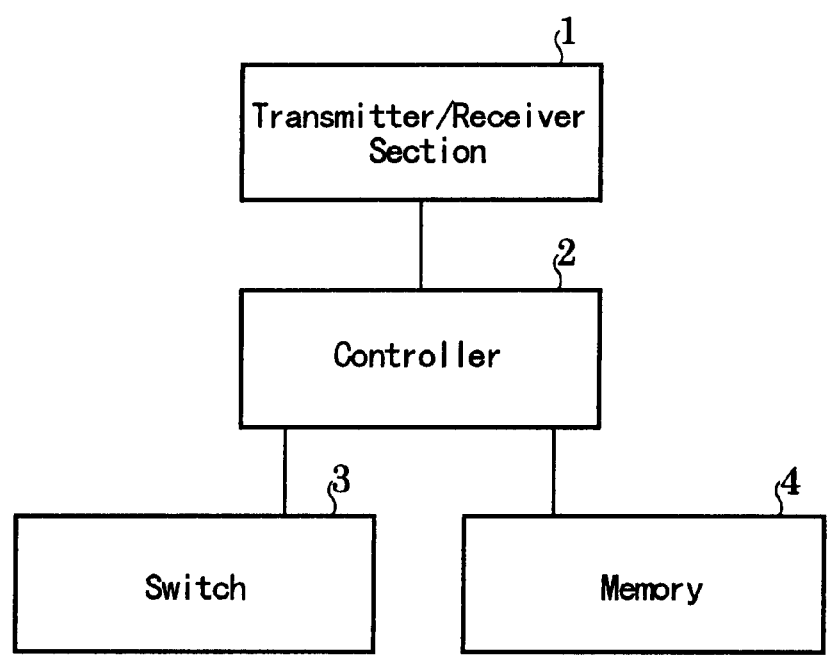
FIG. 2 is a block diagram schematically indicating the constitution of a dual-mode portable terminal device.

FIG. 2 is a block diagram indicating the constitution of a dual-mode portable terminal device.

As shown in FIG. 2, a dual-mode portable terminal device comprises a transmitter/receiver section 1, a controller 2, a switch 3 and a memory 4. The transmitter/receiver section 1 includes a circuit for both a transmitter function and a receiver function, which is the same as a conventional one. The controller 2 includes a micro-processor capable of controlling the operation of the portable terminal device. This controller 2 may operate a desired channel scan. Accordingly, a program for controlling the operations shown in FIG. 1 may be written into the controller 2. The switch 3 is provided to switch ON or OFF the electric power source for the portable terminal device. Upon switching ON the electric power source a suitable channel may be selected. The memory 4 comprises a Random Access Memory provided to store state information indicating a previous Idle state. However, such a memory 4 also comprises a non-volatile memory so that information stored in the memory will not disappear even if the switch 3 of the portable terminal device is turned OFF. These hardware components appear superficially similar to those of a conventional portable terminal device. If a program for performing an operation for channel scanning is installed into the controller 2, and if the memory 4 is sufficient to store the above state information, the method of the present invention may be employed without any difficulty.

What is claimed is:

1. The channel scanning method used for a dual-mode portable terminal device that responds to an AMPS and a CDMA system, said method comprising:

storing information for identifying a channel caught in a previous Idle state;

storing a PN value used in said previous Idle state when said channel caught in said previous Idle state corresponds to a CDMA channel;

starting a CDMA channel scan from the CDMA system when said channel caught in said previous Idle state corresponds to a CDMA channel;

starting an AMPS channel scan from the AMPS when said channel caught in said previous Idle state corresponds to an AMPS channel; and searching a previously used PN value or a nearby PN value for the device to catch a suitable channel.

2. The channel scanning method according to claim 1, further comprising:

starting said AMPS channel scan, when said CDMA channel scan is started and said previously used PN value or said nearby PN value is searched but the device fails to catch said suitable channel.

3. The channel scanning method according to claim 2, further comprising:

starting said CDMA channel scan upon catching said AMPS channel.

4. A channel scanning method of a portable terminal device that responds to a CDMA system, said method comprising:

storing a PN value used in a previous Idle state; and starting a CDMA channel scan from searching a previously used PN value or a nearby PN value for the device to catch a suitable channel.

5. A channel scanning method used for a dual-mode portable terminal device that responds to an AMPS and a CDMA system, said method comprising:

storing information for identifying a channel caught in a previous Idle state;

starting a CDMA channel scan from the CDMA system when said channel caught in the previous Idle state corresponds to a CDMA channel; and starting an AMPS channel scan from the AMPS when said channel caught in the previous Idle state corresponds to an AMPS channel, wherein said information includes a PN value used in said previous Idle state when said channel caught in said previous Idle state corresponds to said CDMA channel.

6. The channel scanning method according to claim 5, further comprising:

storing said information for identifying said caught channel and said PN value used in said previous Idle state when said channel caught in said previous Idle state corresponds to said CDMA channel;

starting said CDMA channel scan from the CDMA system; and searching a previously used PN value or a nearby PN value for the device to catch a suitable channel.

7. The channel scanning method according to claim 6, further comprising:

starting said AMPS channel scan, when said CDMA channel scan is started and said previously used PN value or said nearby PN value is searched but the device fails to catch said suitable channel.

8. The channel scanning method according to claim 7, further comprising:

starting said CDMA channel scan upon catching said AMPS channel.

* * * * *

UNITED STATES PATENT AND TRADEMARK OFFICE
CERTIFICATE OF CORRECTION

PATENT NO. : 6,393,006 B1
DATED : May 21, 2002
INVENTOR(S) : Yasunari Kajihara

It is certified that error appears in the above-identified patent and that said Letters Patent is hereby corrected as shown below:

<u>Title page,</u>
Item [73], Assignee: change "Oki Electric Company Industry Co., Ltd." to
-- Oki Electric Industry Co., Ltd. --.

Signed and Sealed this

Twenty-second Day of October, 2002

Attest:

Attesting Officer

JAMES E. ROGAN
*Director of the United States Patent and Trademark Office*